US008954195B2

(12) United States Patent
Summer et al.

(10) Patent No.: US 8,954,195 B2
(45) Date of Patent: Feb. 10, 2015

(54) HYBRID GESTURE CONTROL HAPTIC SYSTEM

(71) Applicant: Harris Corporation, Melbourne, FL (US)

(72) Inventors: Matthew D. Summer, Melbourne, FL (US); Paul M. Bosscher, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 159 days.

(21) Appl. No.: 13/672,774

(22) Filed: Nov. 9, 2012

(65) Prior Publication Data

US 2014/0135991 A1    May 15, 2014

(51) Int. Cl.
    G05B 15/00    (2006.01)
    B25J 13/02    (2006.01)
    B25J 13/08    (2006.01)

(52) U.S. Cl.
    CPC ............... B25J 13/025 (2013.01); B25J 13/02 (2013.01); B25J 13/081 (2013.01); B25J 13/084 (2013.01)
    USPC ........... 700/264; 700/245; 700/247; 700/257; 700/258; 700/260

(58) Field of Classification Search
    CPC ............ B23Q 17/0966; B23Q 17/2233; B25J 9/1697; B25J 13/085; B25J 9/0081; G05B 2219/39532; G05B 2219/39198; G05B 2219/42092
    USPC ................. 701/264, 245, 247, 257, 258, 260; 901/3, 8, 9, 33, 34
    See application file for complete search history.

(56) References Cited

U.S. PATENT DOCUMENTS

| 3,280,991 A | 10/1966 | Melton |
| 3,637,092 A | 1/1972 | George et al. |
| 4,216,467 A | 8/1980 | Colston |

(Continued)

FOREIGN PATENT DOCUMENTS

| EP | 0672507 A1 | 9/1995 |
| EP | 1 876 505 A1 | 1/2008 |

(Continued)

OTHER PUBLICATIONS

Torres Rocco, A.C., "Development and testing of a new C-based algorithm to control 9-degree-of-freedom wheelchair-mounted-robotic-arm system". Jun. 1, 2010, Univ. of So. Florida.

(Continued)

*Primary Examiner* — Khoi Tran
*Assistant Examiner* — Jorge Peche
(74) *Attorney, Agent, or Firm* — Robert J. Sacco, Esq; Fox Rothschild LLP

(57) ABSTRACT

System (100) and methods (500) for remotely controlling a slave device (102). The methods involve: using a Hybrid Hand Controller ("HHC") as a full haptic controller to control the slave device when the HHC (406) is coupled to a docking station (460); detecting when the HHC is or is being physically de-coupled from the docking station; automatically and seamlessly transitioning an operational mode of at least the HHC from a full haptic control mode to a gestural control mode, in response to a detection that the HHC is or is being de-coupled from the docking station; and using at least the HHC as a portable gestural controller to control the slave device when the HHC is de-coupled from the docking station.

18 Claims, 6 Drawing Sheets

(56) References Cited

U.S. PATENT DOCUMENTS

| | | | |
|---|---|---|---|
| 4,521,685 A | 6/1985 | Rebman | |
| 4,604,016 A | 8/1986 | Joyce | |
| 4,655,673 A | 4/1987 | Hawkes | |
| 4,661,032 A | 4/1987 | Arai | |
| 4,762,006 A | 8/1988 | Asakawa et al. | |
| 4,791,588 A | 12/1988 | Onda et al. | |
| 4,795,296 A | 1/1989 | Jau | |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A | 8/1989 | Seraji | |
| 4,862,751 A | 9/1989 | Asakawa et al. | |
| 4,893,981 A | 1/1990 | Yoshinada et al. | |
| 4,975,856 A | 12/1990 | Vold et al. | |
| 5,004,391 A | 4/1991 | Burdea | |
| 5,007,300 A | 4/1991 | Siva | |
| 5,018,922 A | 5/1991 | Yoshinada et al. | |
| 5,092,645 A | 3/1992 | Okada | |
| 5,184,319 A | 2/1993 | Kramer | |
| 5,193,963 A | 3/1993 | McAffee et al. | |
| 5,231,693 A | 7/1993 | Backes et al. | |
| 5,382,885 A | 1/1995 | Salcudean et al. | |
| 5,413,454 A | 5/1995 | Movsesian | |
| 5,430,643 A | 7/1995 | Seraji | |
| 5,451,924 A | 9/1995 | Massimino et al. | |
| 5,508,596 A | 4/1996 | Olsen | |
| 5,565,891 A | 10/1996 | Armstrong | |
| 5,589,828 A | 12/1996 | Armstrong | |
| 5,619,180 A | 4/1997 | Massimino et al. | |
| 5,648,897 A | 7/1997 | Johnson et al. | |
| 5,694,013 A | 12/1997 | Stewart et al. | |
| 5,737,500 A | 4/1998 | Seraji et al. | |
| 5,792,165 A | 8/1998 | Klieman et al. | |
| 5,831,408 A * | 11/1998 | Jacobus et al. | 318/568.11 |
| 6,028,593 A | 2/2000 | Rosenberg et al. | |
| 6,047,610 A | 4/2000 | Stocco et al. | |
| 6,084,587 A | 7/2000 | Tarr et al. | |
| 6,088,017 A | 7/2000 | Tremblay et al. | |
| 6,104,158 A | 8/2000 | Jacobus et al. | |
| 6,184,868 B1 | 2/2001 | Shahoian et al. | |
| 6,191,796 B1 | 2/2001 | Tarr | |
| 6,246,390 B1 | 6/2001 | Rosenberg | |
| 6,271,833 B1 | 8/2001 | Rosenberg et al. | |
| 6,281,651 B1 | 8/2001 | Haanpaa et al. | |
| 6,522,952 B1 | 2/2003 | Arai et al. | |
| 6,535,793 B2 | 3/2003 | Allard | |
| 6,592,315 B2 | 7/2003 | Osborne, Jr. | |
| 6,636,161 B2 | 10/2003 | Rosenberg | |
| 6,705,871 B1 | 3/2004 | Bevirt et al. | |
| 6,781,569 B1 | 8/2004 | Gregorio et al. | |
| 6,793,653 B2 | 9/2004 | Sanchez et al. | |
| 6,801,008 B1 | 10/2004 | Jacobus et al. | |
| 6,857,878 B1 | 2/2005 | Chosack et al. | |
| 7,138,981 B2 | 11/2006 | Kim et al. | |
| 7,158,112 B2 | 1/2007 | Rosenberg et al. | |
| 7,168,748 B2 | 1/2007 | Townsend et al. | |
| 7,208,900 B2 * | 4/2007 | Carlson et al. | 318/568.11 |
| 7,225,404 B1 | 5/2007 | Zilles et al. | |
| 7,345,672 B2 | 3/2008 | Jacobus et al. | |
| 7,480,600 B2 | 1/2009 | Massie et al. | |
| 7,714,895 B2 | 5/2010 | Pretlove et al. | |
| 7,783,384 B2 | 8/2010 | Kraft | |
| 7,933,667 B2 * | 4/2011 | Sjoberg et al. | 700/82 |
| 8,226,072 B2 | 7/2012 | Murayama | |
| 8,373,391 B1 * | 2/2013 | Allen et al. | 320/115 |
| 8,447,440 B2 | 5/2013 | Phillips et al. | |
| 8,473,101 B2 | 6/2013 | Summer | |
| 2001/0002098 A1 | 5/2001 | Haanpaa et al. | |
| 2001/0037163 A1 | 11/2001 | Allard | |
| 2003/0169235 A1 | 9/2003 | Gron et al. | |
| 2004/0189675 A1 | 9/2004 | Pretlove et al. | |
| 2004/0254771 A1 | 12/2004 | Riener et al. | |
| 2005/0087373 A1 | 4/2005 | Wakitani et al. | |
| 2005/0252329 A1 | 11/2005 | Demers | |
| 2006/0048364 A1 | 3/2006 | Zhang et al. | |
| 2006/0066574 A1 | 3/2006 | Kim et al. | |
| 2006/0117258 A1 | 6/2006 | Yu | |
| 2006/0178775 A1 * | 8/2006 | Zhang et al. | 700/245 |
| 2007/0013336 A1 | 1/2007 | Nowlin et al. | |
| 2007/0050139 A1 | 3/2007 | Sidman | |
| 2007/0095582 A1 | 5/2007 | Stuijt et al. | |
| 2008/0009971 A1 | 1/2008 | Kim et al. | |
| 2008/0063400 A1 | 3/2008 | Hudson et al. | |
| 2008/0161733 A1 | 7/2008 | Einav et al. | |
| 2008/0266254 A1 | 10/2008 | Robbins et al. | |
| 2009/0074252 A1 | 3/2009 | Dariush et al. | |
| 2009/0182436 A1 | 7/2009 | Ferrara | |
| 2009/0234499 A1 | 9/2009 | Nielsen et al. | |
| 2010/0019890 A1 | 1/2010 | Helmer et al. | |
| 2010/0023185 A1 | 1/2010 | Terwelp et al. | |
| 2010/0041991 A1 | 2/2010 | Roundhill | |
| 2010/0070079 A1 | 3/2010 | Mangaser et al. | |
| 2010/0084513 A1 | 4/2010 | Gariepy et al. | |
| 2010/0092267 A1 | 4/2010 | Najdovski et al. | |
| 2010/0100256 A1 | 4/2010 | Jurmain et al. | |
| 2010/0168918 A1 | 7/2010 | Zhao et al. | |
| 2010/0169815 A1 | 7/2010 | Zhao et al. | |
| 2010/0172733 A1 | 7/2010 | Chalubert et al. | |
| 2010/0259614 A1 | 10/2010 | Chen | |
| 2011/0015569 A1 | 1/2011 | Kirschenman et al. | |
| 2011/0046781 A1 | 2/2011 | Summer | |
| 2011/0106339 A1 | 5/2011 | Phillips et al. | |
| 2011/0144828 A1 | 6/2011 | Chengalva | |
| 2011/0155785 A1 | 6/2011 | Laurent et al. | |
| 2011/0257786 A1 | 10/2011 | Caron L'Ecuyer et al. | |
| 2012/0095619 A1 | 4/2012 | Pack et al. | |
| 2012/0150351 A1 | 6/2012 | Bosscher et al. | |
| 2012/0184955 A1 * | 7/2012 | Pivotto et al. | 606/41 |
| 2012/0185098 A1 | 7/2012 | Bosscher et al. | |
| 2012/0185099 A1 | 7/2012 | Bosscher et al. | |
| 2012/0294696 A1 | 11/2012 | Summer et al. | |
| 2012/0306741 A1 | 12/2012 | Gupta | |
| 2013/0328770 A1 * | 12/2013 | Parham | 345/157 |
| 2014/0031983 A1 | 1/2014 | Low et al. | |

FOREIGN PATENT DOCUMENTS

| | | |
|---|---|---|
| FR | 2 898 824 A1 | 9/2007 |
| GB | 2 228 783 A | 9/1990 |
| WO | 95 30571 A1 | 11/1995 |
| WO | 03 055061 A1 | 7/2003 |
| WO | 2006 016799 A1 | 2/2006 |
| WO | 2007051000 A2 | 5/2007 |
| WO | 2008 135978 | 11/2008 |
| WO | 2010 040215 A1 | 4/2010 |
| WO | 2010/085184 A1 | 7/2010 |
| WO | 2011075093 | 6/2011 |

OTHER PUBLICATIONS

Alqasemi, R., et al., "Maximizing Manipulation Capabilities for People with Disabilities Using 9-DoF Wheelchair-Mounted Robotic Arm System", 2007, IEEE.

International Search Report mailed May 12, 2014, Applicaiton Serial No. PCT/US2013/069071, in the name of Harris Corporation.

Alqasemi R et al: "Kinematics, control and redundancy resolution of a 9-DoF wheelchair-mounted robotic arm system for ADL tasks",Mechatronics and Its Applications, 2009. ISMA '09. 6th International Symposium on, IEEE, Piscataway, NJ, USA, Mar. 23, 2009, pp. 1-7.

Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.

Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.

International Search Report mailed May 2, 2013, International Application No. PCT/US2012/051314, in the name of Harris Corporation.

Information about Related Patents and Patent Applications, see section 6 of the accompanying Information Disclosure Statement Letter, which concerns Related Patents and Patent Applications.

(56) References Cited

OTHER PUBLICATIONS

European Search Report mailed Mar. 14, 2012, Application Serial No. 11009319.2-2316, in the name of Harris Corporation.

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE-Piscataway, NJ, USA, Piscataway, NJ, USA, May 19, 2008, pp. 212-219.

International Search Report mailed May 23, 2012; Application Serial No. PCT/US2011/066873 in the name of Harris Corporation.

Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.

Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, USA, IEEE, US, vol. 2, 4, Nov. 1996, pp. 425-430, XP010212433.

Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.

International Search Report mailed Jun. 28, 2012, Application Serial No. PCT/US2012/027475 in the name of Harris Corporation.

Marshall, W.C., et al., "A Testbed for Deisgn of User-Friendly, Multiple-Degree-Of-Freedom, Manual Controllers", Scientific Honeyweller, Honeywell's Corporate. Minneapolis, US Jan. 1, 1993, pp. 78-86.

International Search Report dated Oct. 29, 2012; Application Serial No. PCT/US2012/034207 in the name of Harris Corporation.

International Search Report dated Jan. 15, 2013, Application Serial No. PCT/US2012/037751 in the name of Harris Corporation.

International Search Report mailed Jan. 4, 2013, International Application Serial No. PCT/US2012/058303 in the name of Harris Corporation.

Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.

Rogers, JE., et al., "Bi-directional Gap Closing MEMS Actuator Using Timing and Control Techniquest", IEEE Industrial Electronics, IECON 2006—32nd Annual Conference on, IEEE, Piscataway, NJ USA Nov. 1, 2006, pp. 3469-3154.

Tijsma, et al., "A framework of interface improvements for designing new user interfaces for the MANUS robot arm", 2005, IEEE, 9th International Conference on Rehabilitation Robotics, Jul. 28-Jul. 1, 2005, Chicago, IL, USA.

Rocco, Ana Catalina Torres, Development and testing of a new C-based algoithm to control a 9-degree-of-freedom wheelchair-mounted-robotic-arm system, University of South Florida, Jun. 1, 2010.

\* cited by examiner

HYBRID GESTURE CONTROL HAPTIC SYSTEM

STATEMENT OF THE TECHNICAL FIELD

The inventive arrangements relate to systems and methods for controlling robots. More particularly, the inventive arrangements concern systems and methods for controlling a robot via gesture controls with tactile feedback and/or haptic controls with tactile feedback.

DESCRIPTION OF THE RELATED ART

Simple user interface systems can provide a separately operable control for each movable joint of a robot, robotic manipulator, or other slave device. More complex systems can include hand controllers (sometimes in the form of a joy stick or pistol grip), which sense the movement by a user's hand. The hand controller generates one or more control signals which are then used for actuating various motion operations of the robot. The control system of the robot will respond to these control signals by activating certain servomotors, solenoids, or other devices within the robotic manipulator to produce the desired action. Video cameras can be used to provide visual information to a remote operator regarding a work piece and/or the environment surrounding the robotic manipulator.

Haptic technology or haptics involves tactile feedback provided by a device to a user. The tactile feedback is typically provided by applying forces, vibrations and/or motions to one or more portions of a user interface device. Haptics are sometimes used to enhance remote control devices associated with machines and devices. For example, U.S. Pat. No. 5,831,408 to Jacobus et al. discloses that force feedback systems are sometimes used to communicate forces generated on a robotic hand back to a user, through a hand controller. If the robotic hand physically engages an object, the physical engagement is felt by the user's hand. In such systems, force sensors in the slave device detect forces exerted upon such device. The information relating to such forces is communicated to a control unit, where the information is used to generate suitable tactile feedback for a user.

In many conventional systems, the tactile feedback involves vibrating the remote control device. The vibration is not a directional vibration. As such, the sensation that the user experiences as a result of the haptic feedback is not realistic.

SUMMARY OF THE INVENTION

The invention concerns systems and methods for remotely controlling a slave device. The methods involve: detecting when a Hybrid Hand Controller ("HHC") is or is being physically coupled to a docking station; automatically transitioning an operational mode of at least the HHC from a gestural control mode to a full haptic control mode, in response to such a detection; using the HHC as a full haptic controller to control the slave device when the HHC is coupled to a docking station. Notably, an amount of time required to automatically transition the operational mode in this first manner is of a value which ensures that a user of the HHC does not experience any interruptions in a control of the slave device.

The methods also involve detecting when the HHC is or is being physically de-coupled from the docking station. In response to a detection that the HHC is or is being de-coupled from the docking station, an operational mode of at least the HHC is automatically transitioned from the full haptic control mode to the gestural control mode. Thereafter, at least the HHC is used as a portable gestural controller to control the slave device. Notably, the amount of time required to automatically transition the operational mode in this second manner is of a value which ensures that the user of the HHC does not experience any interruptions in the control of the slave device.

When the HHC is being used as the full haptic controller or the gestural controller, a directional tactile or haptic feedback is generated such that the user feels a physical engagement of the slave device with an object. In some scenarios, the directional tactile or haptic feedback is generated by causing only a portion of the HHC to vibrate. The portion of the HHC is selected based on results from translating a spatial direction associated with a force applied to the slave device to a coordinate direction associated with the HHC. The coordinate direction is determined based on an orientation of a user's hand relative to an orientation of the HHC.

The methods may additionally involve detecting when a distance between the HHC and the docking station is equal to or greater than a threshold value for a pre-defined period of time. In response to such a detection, the operational mode of the HHC is automatically transitioned from the gestural control mode to a power-save gestural control mode. In contrast, the operational mode of the HHC is automatically transitioned from a power-save gestural control mode to the gestural control mode when it is detected that the distance between the HHC and the docking station is equal to or less than a threshold value for a pre-defined period of time.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
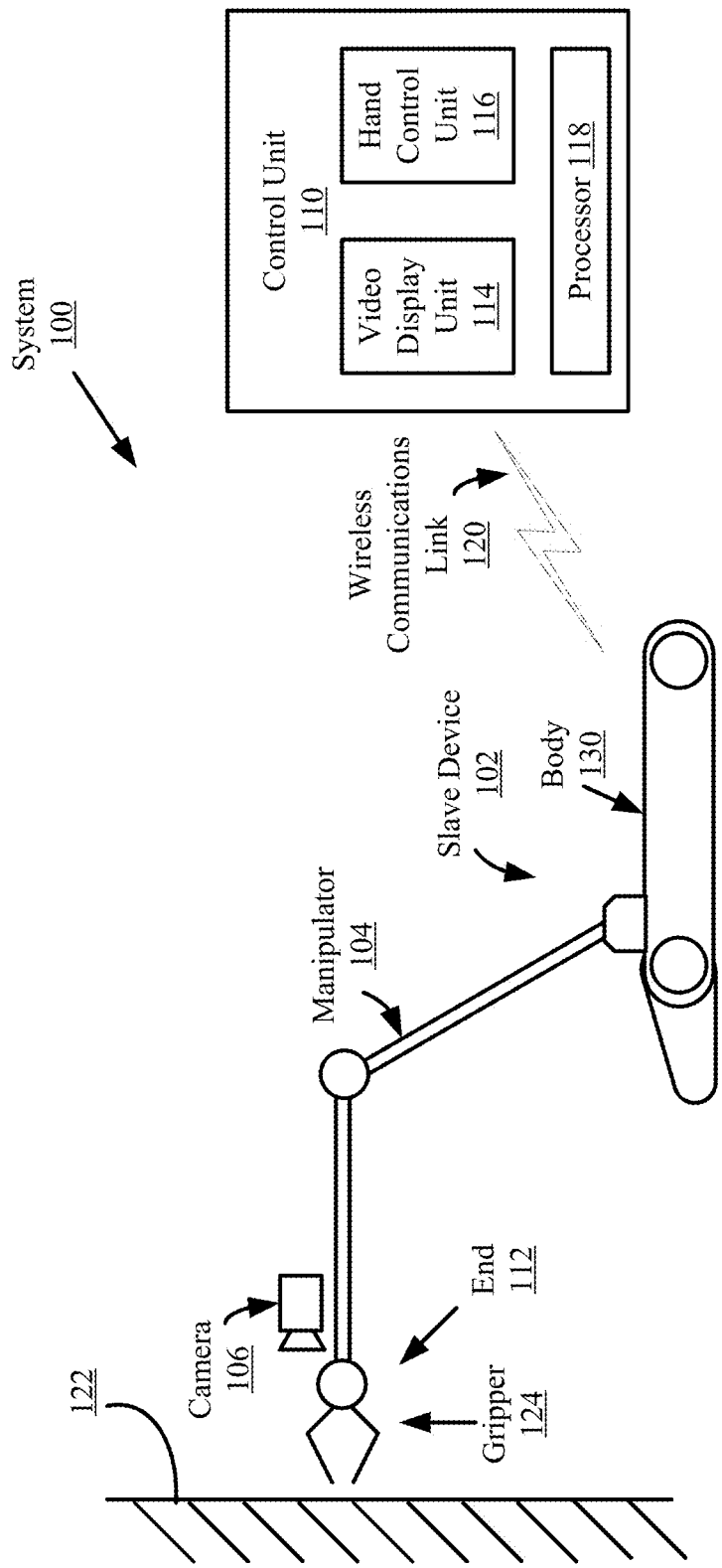
FIG. 1 is a schematic illustration of an exemplary wireless network system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-5B. Embodiments generally relate to systems and methods for remotely controlling a slave device. The methods generally involve: collectively using an HHC as a full haptic controller to control the slave device when the HHC is coupled to the docking station; detecting when the HHC is or is being physically de-coupled from the docking station; automatically transitioning an operational mode of at least the HHC from a full haptic control mode to a gestural control mode, in response to a detection that the HHC is or is being de-coupled from the docking station; and using at least the HHC as a portable gestural controller to control the slave device when the HHC is de-coupled from the docking station. Notably, the operational mode transition is seamlessly performed, i.e., the amount of time required to automatically transition the operational mode is of a value which ensures that a user of the HHC does not experience any interruptions in the control of the slave device. Such a method provides a control system that leverages the features of a full haptic control method and a gestural control method depending on specific task requirements. For example, when used as a full haptic controller, the HHC provides high-fidelity force feedback, directional haptic sensation, and precision motion control. When used as a gestural controller, the HHC is portable and not constrained to a specific area. As such, the user's movement of the HHC are more intuitive as compared to that of the full haptic controller.

Referring now to FIG. 1, there is provided a schematic illustration of an exemplary Wireless Network System ("WNS") 100. The WNS 100 is generally configured for allowing a user to control a remotely located slave device 102. The slave device 102 can include any type of remotely controlled slave device or robot system capable of performing moving actions, manipulating actions, and/or grasping actions based on telematic commands received thereat. Accordingly, in some scenarios, the slave device 102 is an Unmanned Ground Vehicle ("UGV").

UGVs are often used by first responders or military personnel for search and rescue operations in hazardous and dangerous environments. For example, a UGV may be employed to find and disable an explosive device. In this regard, the slave device 102 may have a manipulator 104 with a camera 106 coupled to a distal end 112 thereof. In this example, the manipulator 104 comprises a robot arm extending from a body 130. The robot arm has a gripper 124 disposed at a distal end 112 thereof for contact, grasping or otherwise manipulating external objects 122 (e.g., an explosive device at least partially hidden under dirt or cloth). The body 130 includes hardware and/or software for controlling the operations of the UGV such that it performs moving actions, manipulating actions, and/or grasping actions based on telematic commands received thereat. The telematic commands are generated by a control unit 110 in response to user inputs thereto.

The control unit 110 may be a mobile unit or a fixed unit capable of communicating with the slave device 102 via a wireless communications link 120. In either scenario, the control unit 110 comprises a video display unit 114 for displaying a video image obtained from the camera 106. A Hand Control Unit ("HCU") 116 senses movements of a user and communicates input signals specifying the sensed movements to the processor 118. The processor 118 processes each input signal to determine if a sensed movement corresponds to an element of a predetermined movement set of the WNS 100. If the sensed movement corresponds to an element of the predetermined movement set, then the processor 118 generates a control signal including a command for controlling the slave device 102 in a specified manner (e.g., move the manipulator up, down, forward, backward, to the right, and/or to the left). Thereafter, the control signal is communicated from the control unit 110 to the slave device 102 via the wireless communications link 120.

In response to the reception of the control signal, the slave device 102 acts in the manner specified therein (e.g., moves the manipulator up, down, forward, backward, to the right, and/or to the left). Consequently, the manipulator 104 may physically engage an object 122. Force sensors (not shown) of the manipulator 104 detect forces exerted thereon as a result of the physical engagement. The information relating to the detected forces is communicated back to the control unit 110 via the wireless communications link 120.

At the control unit 110, the information is then used to generate suitable tactile or haptic feedback for the user. The tactile or haptic feedback allows the physical engagement to be felt by the user's hand, through the HCU 116. Accordingly, the tactile or haptic feedback may include linear forces and/or rotational forces applied to the HCU 116. Advantageously, the linear forces and/or rotational forces are directional forces such that the user's sensation is more realistic than in conventional tactile or haptic feedback systems.

Figure 2:
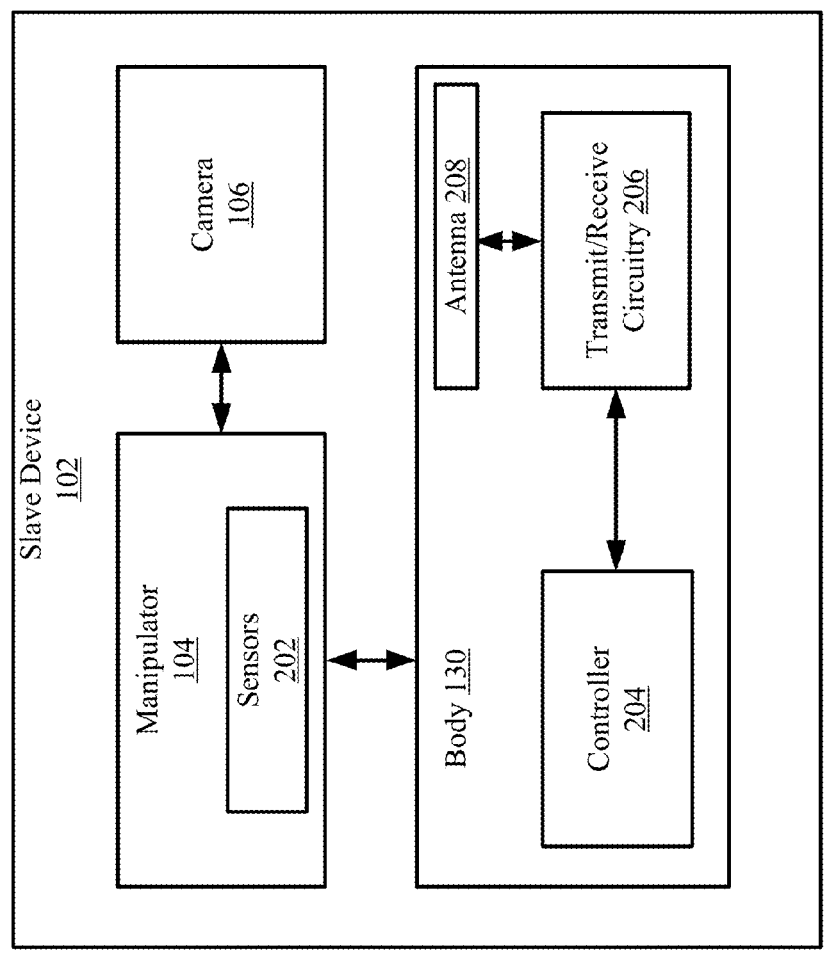
FIG. 2 is a detailed block diagram that is useful for understanding a slave device.

The slave device 102 will now be described in more detail in relation to FIG. 2. As shown in FIG. 2, the body 130 of the slave device 102 comprises a controller 204, transmit/receive circuitry 206 and an antenna 208. The transmit/receive circuitry 206 and an antenna 208 facilitate the wireless communication between the slave device 102 and the control unit 110. Such components 206, 208 are well known in the art, and therefore will not be described herein. Any known transmit/receive circuitry and antenna can be used with the present invention without limitation.

The controller 204 is configured for processing motion control commands received from the control unit 110. As a result of such processing, the controller 204 causes the slave device 102 to perform certain actions in accordance with the motion control commands. For example, the slave device 102 may be caused to move the body 120 in a forward direction, a backward direction, a right direction and/or a left direction. Additionally or alternatively, the slave device 102 may be caused to move the manipulator 104 in a linear motion and/or a rotational motion. The manipulator 104 can be a robot arm including one or more mechanical joints. Robot arms of this type are well known in the art, and therefore will not be described in detail herein. However, a brief description of one example of a manipulator 104 is provided to assist the reader in understanding the invention.

Figure 3:
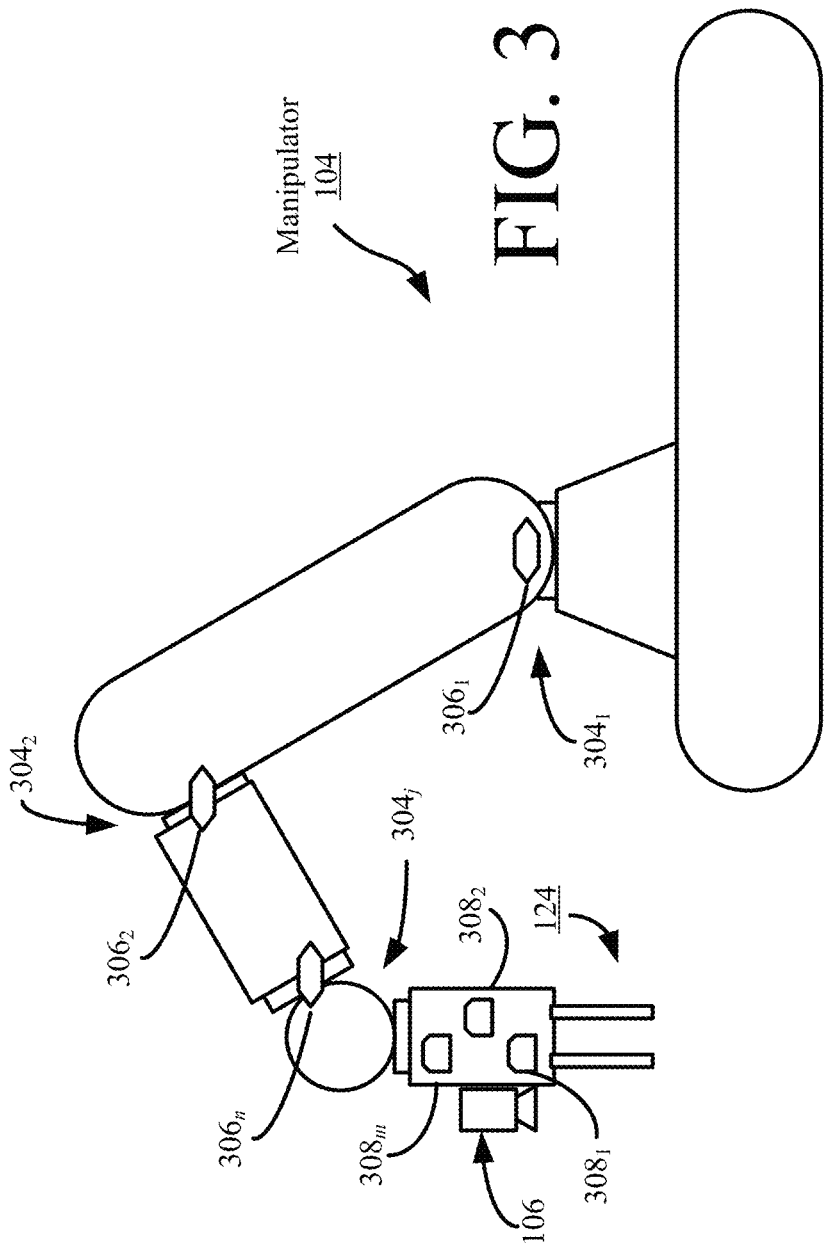
FIG. 3 is a schematic illustration of an exemplary manipulator.

Referring now to FIGS. 2 and 3, the manipulator 104 can include a gripper 124, servo-motors (not shown), sensors $306_1, 306_2, \ldots, 306_n$, and a camera 106 mounted thereon. The servo-motors are configured for moving one or more mechanical joints $304_1, 304_2, \ldots, 304_j$ in a direction and at a velocity determined by the motion control commands. As noted above, the motion control commands are received from the control unit 110. The sensors $306_1, 306_2, \ldots, 306_n$ are configured to detect the position of the mechanical joints $304_1, 304_2, \ldots, 304_j$, respectively. Information relating to the detected positions can be provided to the controller 204 for further processing. In turn, the controller 204 may communicate such information to the control unit 110 for tactile or haptic feedback purposes.

At least one sensor $308_1, 308_2, \ldots, 308_m$ may be provided for detecting forces exerted upon the manipulator 104. In this regard, the sensors $308_1, 308_2, \ldots, 308_m$ are configured to detect forces (i.e., linear and/or rotational forces) exerted upon the manipulator 104 and the gripper 124. In FIG. 3, three (3) force sensors are shown at the base of the gripper 124, but the invention is not limited in this regard. More or fewer force sensors can be advantageously arranged to measure linear and/or rotational forces exerted upon the manipulator 104 when the manipulator 104 physically contacts or touches materials or surfaces in the environment. In some scenarios, the sensors $306_1, 306_2, \ldots, 306_n, 308_1, 308_2, \ldots, 308_m$ are arranged so that the position and forces exerted upon the manipulator 104 are measured with respect to as many as three (3) orthogonal linear axes (x, y, z) and as many as three (3) axes of rotation.

The data from the sensors $306_1, 306_2, \ldots, 306_n, 308_1, 308_2, \ldots, 308_m$ is communicated to the controller 204, which performs any necessary data formatting before communicating the data to transmit/receive circuitry 206. The information is then transmitted from the antenna 208 to the control unit 110.

Figure 4:
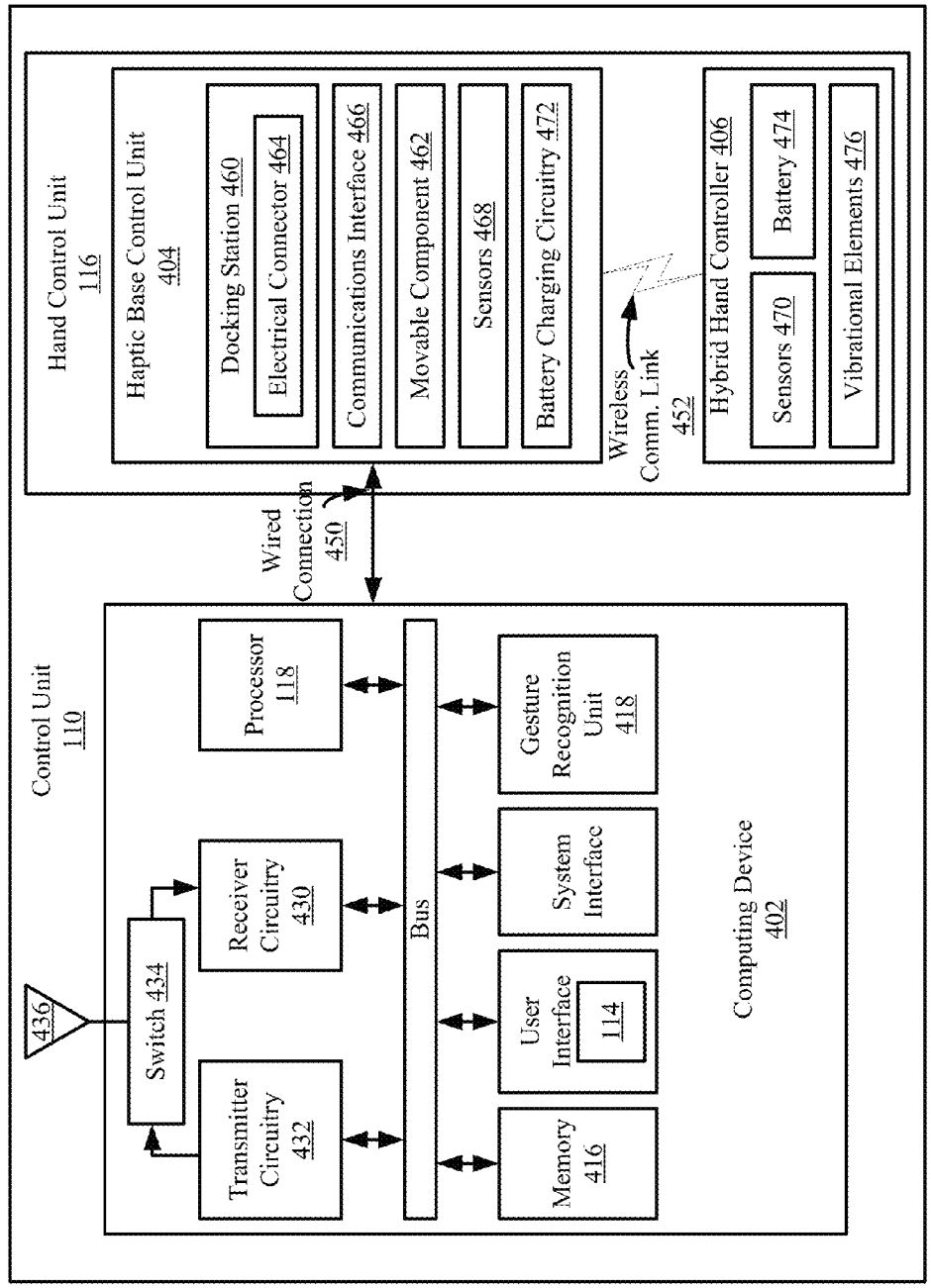
FIG. 4 is detailed block diagram of that is useful for understanding a control unit.

Referring now to FIG. 4, there is provided a more detailed diagram of the control unit 110. The control unit 110 is advantageously designed to: provide an intuitive control interface for commanding slave device motion; enable six Degree of Freedom ("DOF") motion inputs; and provide directional force-feedback or haptic-feedback to the user. The control unit 100 is also configured to be rugged, durable, easily portable and compact. These features of the control unit 100 will become more evident as the discussion progresses.

As shown in FIG. 4, the control unit 110 comprises a computing device 402 and the HCU 116. The computing device 402 and HCU 116 may be communicatively coupled to each other via a wired connection and/or a wireless connection (not shown). For example, the computing device 402 is communicatively coupled to an HBCU 404 of the HCU 116 via the wired connection 450. The HBCU comprises a docking station 460 for an HHC 406. Accordingly, the HHC 406 can be used as a full haptic controller when attached to the HBCU via the docking station 460. In contrast, the HHC 406 can be used as a portable gestural controller when detached from the HBCU. The HHC 406 can include, but is not limited to, a glove, a grip or any other device that allows for transition between the haptic control method and the gestural control method. Such other devices may have a geometry that matches a tool for performing or facilitating mechanical operations. For example, the other devices have geometries that are the same as or similar to a pair of scissors, a pair of pliers, shears, a hammer, a saw, a file, a screw driver, a gripper, and/or a surgical instrument.

Notably, the HCU 116 is configured to provide a seamless transition between the full haptic control method and the gestural control method. In this regard, the HBCU 404 and/or the HHC 406 comprise one or more sensors 468, 470 for detecting when the HHC 406 is and/or is being attached to or detached from the HBCU 404. Such sensors are well known in the art, and therefore will not be described herein. Any known or to be known sensors capable of detecting device coupling/de-coupling can be used without limitation. Upon a detection that the HHC 406 is removed or is currently being removed from the docking station 460, the HHC 406 and HBCU 404 transition their operational modes from a full haptic control mode to a gestural control mode. In contrast, when the HHC 406 is or is being inserted into the docking station 460, the HHC 406 and HBCU 404 transition their operational modes from the gestural control mode to the full haptic control mode. The amount of time required to perform each of the mode transitions is selected to be relatively small such that the user does not experience any interruptions in his/her control of the slave device 102.

During the full haptic control mode, the HHC 406 is physically secured to a movable component of the HBCU 404 via the docking station 460. The physical securement is achieved using an electrical connector 464. The electrical connector 464 can include any known or to be known electrical connector which provides physical securement between two electronic devices. The electrical connector 464 is connected to a movable component 462 and a communications interface 466. The communications interface 466 communicatively couples the HCU 406 to the HBCU 404. The components 464, 466 also facilitate the electrical connection between the HHC 406 and battery charging circuitry 472 of the HBCU 404 such that the rechargeable battery 474 is recharged when the HHC 406 is docked in the docking station 460.

In at least the grip scenario, the HHC 406 is designed to allow a user to grasp a handle portion (not shown) thereof. The user may manipulate the movable component 462 of the HBCU 404 via the HHC 406. The movable component 462 is configured to ensure that the movement of the HHC 406 is physically restricted to or constrained within a defined area (e.g., an area of a two-foot square). The HHC 406 and/or movable component 462 include one or more sensors 470 to detect movement thereof along one, two or three orthogonal axes of motion and/or a rotational axes of motion. The sensors 470 include, but are not limited to, accelerometers, gyroscopes, flex sensors and/or any other sensor that can detect and track movements of an object to which it is attached. Hand controllers of this type are well known in the art, and therefore will not be described in more detail herein. Still, it should be understood that information relating to the detected movement of component 462 is communicated from the sensors 470 to the computing device 402. In turn, the computing device 402 generates motion control commands for purposes of remotely and precisely controlling a pose of a slave device 102 in accordance with user input commands. The motion control commands are communicated from the computing device 402 to the slave device 102 via the transmit circuitry 432, 434, 436.

As described above, the slave device 102 acts in the manner specified by the motion control commands. For example, the slave device 102 travels in a forward direction, a backward direction, a right direction, and/or a left direction. Additionally or alternatively, the manipulator 104 of the slave device 102 is caused to move in a linear or rotational motion. In some scenarios, the manipulator 104 may physically engage an object 122. Force sensors $308_1$, $308_2$, ..., $308_m$ of the manipulator 104 detect forces exerted thereon as a result of the physical engagement. The information relating to the detected forces is communicated back to the control unit 110. This information is received by the control unit 110 via the receive circuitry 436, 434, 430 thereof. At the control unit 110, the information is used to generate suitable tactile or haptic feedback for the user. The tactile or haptic feedback allows the physical engagement to be felt by the user's hand, through the HHC 406. Accordingly, the tactile or haptic feedback may include linear forces and/or rotational forces applied to the HHC 406.

In some scenarios, the tactile or haptic feedback is directional such that the user's sensation is more realistic (i.e., the force applied to the slave device is exactly or substantially duplicated such that the user will feel the same or similar force). For example, if the manipulator 104 squeezes an object, then the force is applied to the user's hand via the HHC 406 such that the user experiences the same or similar sensation as the manipulator 104 as a result of said squeezing. In some scenarios, the duplicated "squeeze-resulting" force is applied to at least one of the user's finger via a trigger mechanism. Similarly, if a right surface of manipulator 104 rubs against a ruff surface of an object, then an internal component of the HHC 406 is actuated such that the HHC 406 shakes in the right direction so as to mimic the vibration experienced by the manipulator 104 as a result of said rubbing.

Accordingly, one or more vibrational elements 476 can be provided internal to the HHC 406. The vibrational elements 476 can include, but are not limited to, a first vibrational element that can cause the HHC 406 to shake in the left and/or right direction, a second vibrational element that can cause the HHC 406 to shake in the up and/or down direction, and/or a third vibrational element that can cause the HHC 406 to shake in a front and/or back direction. Any combination of the vibrational elements can be actuated to shake the HHC 406 is one or more directions at any given time. A determination as to which vibrational element(s) to actuate at a particular time can be made based on results of a translation process. The translation process involves translating a spatial direction associated with the force applied to the slave device 102 to a coordinate direction associated with the grip portion of the HHC 406. The coordinate direction is determined based on an orientation of the user's hand relative to an orientation of the grip portion. One or more orientations can be detected using any known or to be known sensors which are configured to detect an orientation of an object relative to a pre-defined reference orientation, point, object and/or axes.

In order to transition from the full haptic control mode to the normal gestural control mode, the HHC 406 is removed from the docking station 460 such that it can be carried by the user. In response to the "undocking" of the HHC 406, a wireless communication link 452 is established between the HHC 406 and the HBCU 404. Also, the HHC 406 and HBCU 404 seamlessly transition from their full haptic control mode to their normal gestural control mode. The seemless transitions may occur prior to, simultaneously with, or immediately subsequent to the establishment of the wireless communication link 452.

During the normal gestural control mode, the slave device 102 is commanded and controlled by moving the HHC 406 through a sequence of movements. Notably, the movement of the HHC 406 is not restricted to a pre-defined area, as is the case in the full haptic control mode. Consequently, the user's movement of the HHC 406 is unconstrained and more intuitive.

One or more sensors 470 can be provided with the HHC 406 for detecting a series of movements, such as all or part of the HHC 406 or a gesture performed by the user of the HHC 406. In this regard, the sensors 470 can include, but are not limited to, accelerometers, gyroscopes, flex sensors and/or any other sensor that can detect and track movements of an object to which it is attached.

In some scenarios, the HCU 116 performs operations to distinguish between different movements and/or series of movements. Additionally or alternatively, the computing device 402 performs such operations. In this regard, at least one of the HCU 116 and the computing device 402 includes a gesture recognition unit 418 for determining whether a given movement and/or series of movements corresponds with at least one pre-defined command for controlling the slave device 102. This determination can be made based on the results of a comparison operation. The comparison operation involves comparing information describing a detected movement or series of detected movements to entries stored in an internal or external memory (e.g., memory 416 of the computing device 402) so as to identify a corresponding element of a pre-determined gestural language set. The gestural language set can include at least one command movement or series of movements. Subsequent to identifying the corresponding element of the pre-determined gestural language set, a motion control command is generated by the computing device 402 for purposes of remotely and precisely controlling a pose of a slave device 102 in accordance with user input commands. The motion control command is then communicated from the computing device 402 to the slave device 102 via transmit circuitry 432, 434, 436.

As described above, the slave device 102 acts in the manner specified by the motion control commands. For example, the slave device 102 travels in a forward direction, a backward direction, a right direction, and/or a left direction. Additionally or alternatively, the manipulator 104 of the slave device 102 is caused to move in a linear or rotational motion. In some scenarios, the manipulator 104 may physically engage an object 122. Force sensors $308_1$, $308_2$, ..., $308_m$ of the manipulator 104 detect forces exerted thereon as a result of the physical engagement. The information relating to the detected forces is communicated back to the control unit 110. At the control unit 110, the information is then used to generate suitable tactile or haptic feedback for the user. The tactile or haptic feedback allows the physical engagement to be felt by the user's hand, through the portable HHC 406 being carried by the user. Accordingly, the tactile or haptic feedback may include linear forces and/or rotational forces applied to the portable HHC 406.

In some scenarios, the tactile or haptic feedback is directional such that the user's sensation is more realistic (i.e., the force applied to the slave device is exactly or substantially duplicated such that the user will feel the same or similar force). For example, if the manipulator 104 squeezes an object, then the force is applied to the user's hand via the portable HHC 406 such that the user experiences the same or similar sensation as the manipulator as a result of said squeezing. In some scenarios, the duplicated "squeeze-resulting" force is applied to a user's finger via a trigger mechanism. Similarly, if a right surface of manipulator 104 rubs against a ruff surface of an object, then an internal component of the portable HHC 406 is actuated such that it shakes in the right direction.

Notably, when in the gestural control mode, the portable HHC 406 and/or the HBCU 404 perform operations for determining and tracking the distance therebetween. If the distance is currently less than or equal to a threshold distance value (e.g., ten feet), then the portable HHC 406 and HBCU 404 operate in a normal gestural control mode, in which all gestural control operations are enabled. In contrast, if the distance is currently greater than the threshold distance value (e.g., ten feet), then the portable HHC 406 operates in a power-save gestural control mode, in which some of the gestural control operations thereof are disabled. For example, some of the sensors 470 may be entirely disabled or periodically enabled/disabled for purposes of conserving power.

Figure 5A:
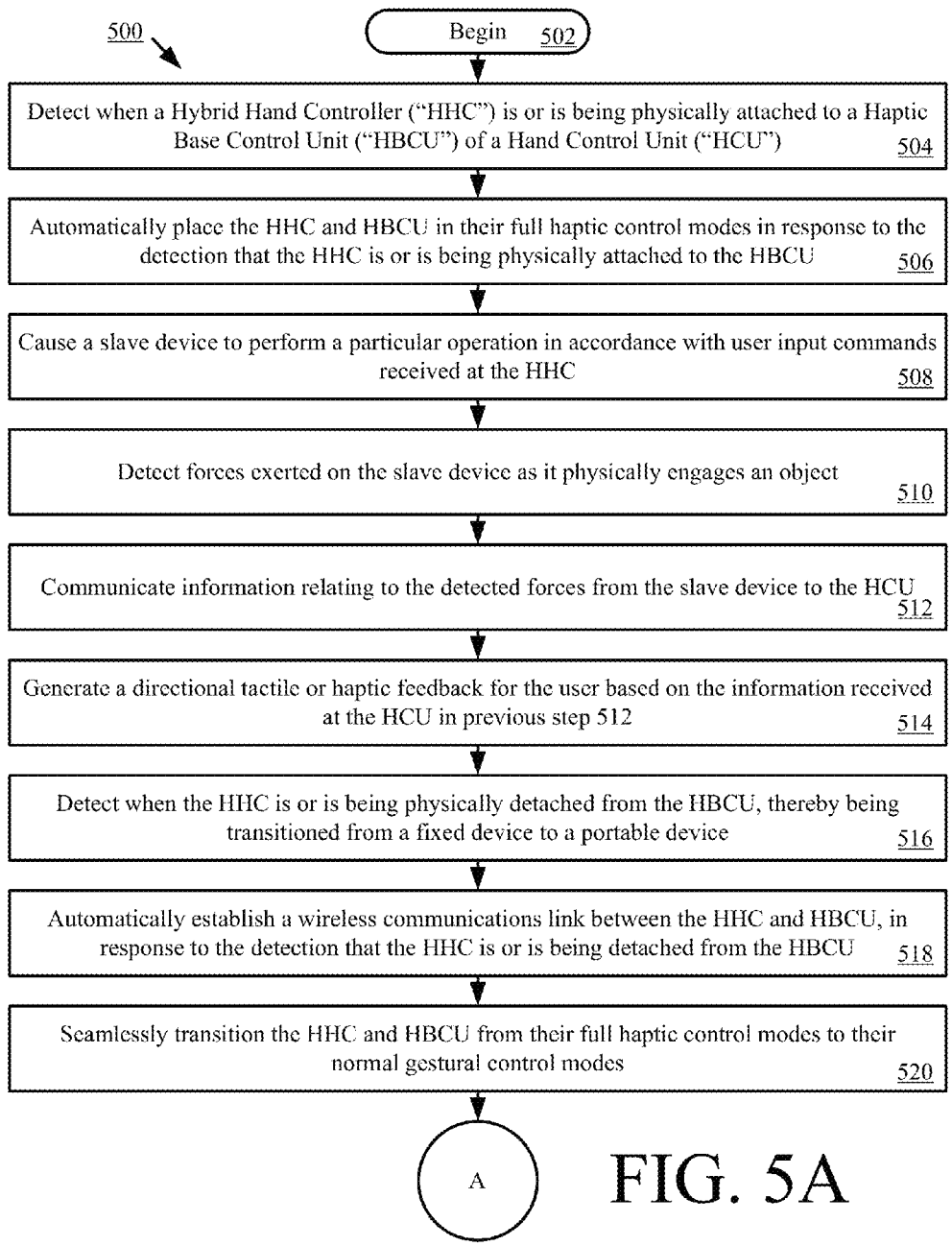
FIGS. 5A-5B collectively provide a flow chart of an exemplary method that is useful for understanding the invention.
Figure 5B:
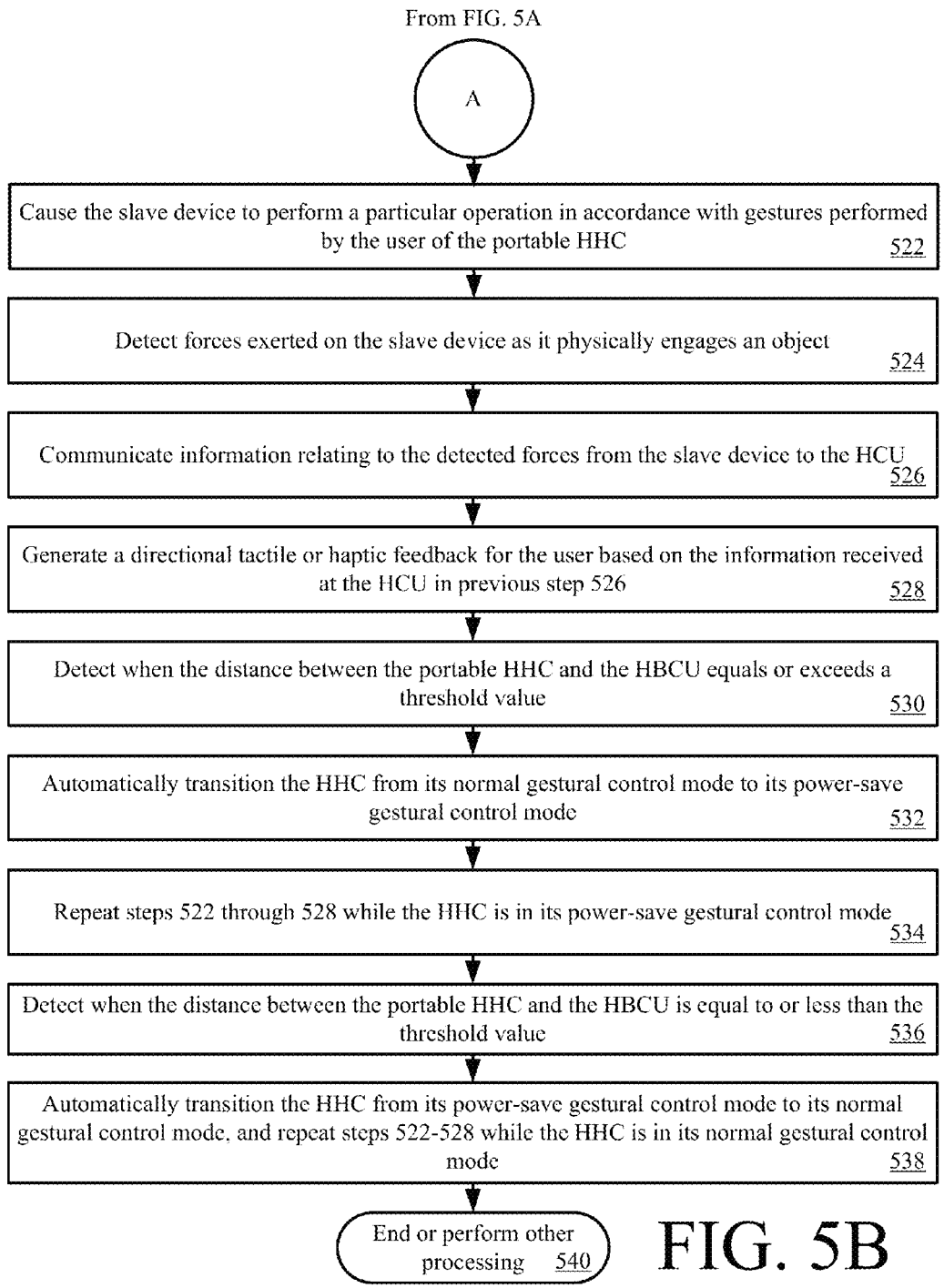

Referring now to FIGS. 5A-5B, there is provided a flow diagram of an exemplary method 500 for remotely controlling a slave device (e.g., slave device 102 of FIG. 1). The method 500 begins with step 502 and continues to step 504. In step 504, a detection is made that an HHC (e.g., HHC 406 of FIG. 4) is or is being physically attached to an HBCU (e.g., HBCU 404 of FIG. 4). In response to such a detection, step 506 is performed where the HHC and HBCU are automatically placed in their full haptic control modes. While in their full haptic control modes, the slave device is caused to perform a particular operation in accordance with user input commands received at the HHC, as shown by step 508. At the slave device, forces exerted thereon are detected in step 510 as it physically engages an object (e.g., object 122 of FIG. 1). In a next step 512, information relating to the detected forces is communicated from the slave device to the HCU. Thereafter in step 514, directional tactile or haptic feedback is generated for the user based on the "force-related" information previously received at the HCU.

In a next step 516, a detection is made that the HHC is or is being physically detached from the HBCU. As a result of this physical detachment, the HHC is transitioned from a "fixed" device to a "portable" device. In response to the detection that the HHC is or is being physically detached from the HBCU, a wireless communications link (e.g., wireless communications link 452 of FIG. 4) is established between the HHC and HBCU in step 518. Subsequent to or simultaneously with step 518, step 520 is performed where the HHC and HBCU are transitioned from their full haptic control modes to their normal gestural control modes. Upon completing step 520, the method 500 continues with step 522 of FIG. 5B.

As shown in FIG. 5B, step 522 involves causing the slave device to perform a particular operation in accordance with gestures performed by the user of the portable HHC. As a result of the operational performance, the slave device may physically engage on object. In this scenario, the slave device detects forces applied thereto from the physical engagement of the object, as shown by step 524. Information relating to the detected forces is communicated from the slave device to the HCU in step 526. As a result of receiving said information, directional tactile or haptic feedback is generated for the user based on said information, as shown by step 528.

Subsequent to completing step 528, step 530 is performed where it is detected that the distance between the portable HHC and the HBCU is equal to or greater than a threshold value (e.g., five feet). Step 530 can also involve starting a timer for ensuring that the distance remains equal to or greater than the threshold value for a pre-defined period of time prior to performing any subsequent steps. In response to said detection and/or expiration of said timer, the HHC is automatically and seamlessly transitioned from its normal gestural control mode to its power-save control mode in step 532. In a next step 534, steps 522-528 are performed while the HHC is in its power-save control mode.

In a next step 536, it is detected that the distance between the portable HHC and the HBCU is equal to or less than a threshold value (e.g., five feet). Step 536 can also involve starting a timer for ensuring that the distance remains equal to or less than the threshold value for a pre-defined period of time prior to performing any subsequent steps. In response to said detection and/or expiration of said timer, the method continues with subsequent step 538. In step 538, the HHC is automatically and seamlessly transitioned from its power-save gestural control mode to its normal gestural control mode. Also, steps 522-528 are performed while the HHC is in its normal gestural control mode. Thereafter, step 540 is performed where the method 500 ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for remotely controlling a slave device, comprising:
    using a Hybrid Hand Controller ("HHC") as a full haptic controller to control said slave device when said HHC is coupled to a docking station;
    detecting when said HHC transitions from said coupled condition to a de-coupled condition in which it is physically de-coupled from said docking station;
    in response to said detecting, automatically transitioning an operational mode of at least said HHC from (1) a full haptic control mode in which the slave device is controlled in accordance with physically-restricted movement of the HHC within a pre-defined area to (2) a gestural control mode in which the slave device is controlled in accordance with non-physically restricted movement of the HHC; and
    using at least said HHC as a portable gestural controller to control said slave device when said HHC is de-coupled from said docking station.

2. The method according to claim 1, wherein an amount of time required to automatically transition said operational mode is of a value which ensures that a user of said HHC does not experience any interruptions in a control of said slave device.

3. The method according to claim 1, further comprising generating directional tactile or haptic feedback such that said user feels a physical engagement of said slave device with an object.

4. The method according to claim 3, where said directional tactile or haptic feedback is generated by causing only a portion of said HHC to vibrate.

5. The method according to claim 4, further comprising selecting said portion of said HHC based on results from translating a spatial direction associated with a force applied to said slave device to a coordinate direction associated with said HHC.

6. The method according to claim 5, further comprising determining said coordinate direction based on an orientation of a user's hand relative to an orientation of said HHC.

7. The method according to claim 1, further comprising automatically transitioning said operational mode of said HHC from said gestural control mode to a power-save gestural control mode, in response to a detection that a distance between said HHC and said docking station is equal to or greater than a threshold value for a pre-defined period of time.

8. The method according to claim 1, further comprising automatically transitioning said operational mode of said HHC from a power-save gestural control mode to said gestural control mode, in response to a detection that a distance between said HHC and said docking station is equal to or less than a threshold value for a pre-defined period of time.

9. The method according to claim 1, further comprising:
  detecting when said HHC is or is being physically coupled to said docking station; and
  automatically transitioning said operational mode of at least said HHC from said gestural control mode to said full haptic control mode, in response to a detection that said HHC is or is being coupled to said docking station.

10. A system, comprising:
  a slave device;
  a docking station remotely located from said slave device; and
  a Hybrid Hand Controller ("HHC") configured to
    operate as a full haptic controller to control said slave device when coupled to said docking station,
    automatically transition an operational mode thereof from (1) a full haptic control mode in which the slave device is controlled in accordance with physically-restricted movement of the HHC within a pre-defined area to (2) a gestural control mode in which the slave device is controlled in accordance with non-physically restricted movement of the HHC, in response to a detection that said HHC is or is being de-coupled from said docking station, and
    operate as a portable gestural controller to control said slave device when de- coupled from said docking station.

11. The system according to claim 10, wherein an amount of time required to automatically transition said operational mode is of a value which ensures that a user of said HHC does not experience any interruptions in a control of said slave device.

12. The system according to claim 10, wherein said HHC is further configured to generate directional tactile or haptic feedback such that said user feels a physical engagement of said slave device with an object.

13. The system according to claim 12, where said directional tactile or haptic feedback is generated by causing only a portion of said HHC to vibrate.

14. The system according to claim 13, wherein said portion of said HHC is selected based on results from translating a spatial direction associated with a force applied to said slave device to a coordinate direction associated with said HHC.

15. The system according to claim 14, wherein said coordinate direction is determined based on an orientation of a user's hand relative to an orientation of said HHC.

16. The system according to claim 10, wherein said HHC is further configured to automatically transition said operational mode from said gestural control mode to a power-save gestural control mode, in response to a detection that a distance between said HHC and said docking station is equal to or greater than a threshold value for a pre-defined period of time.

17. The system according to claim 10, wherein said HHC is further configured to automatically transition said operational mode of said HHC from a power-save gestural control mode to said gestural control mode, in response to a detection that a distance between said HHC and said docking station is equal to or less than a threshold value for a pre-defined period of time.

18. The system according to claim 10, wherein said HHC is further configured to automatically transition said operational mode from said gestural control mode to said full haptic control mode, in response to a detection that said HHC is or is being coupled to said docking station.

* * * * *